(12) United States Patent
Campbell et al.

(10) Patent No.: US 8,155,026 B2
(45) Date of Patent: Apr. 10, 2012

(54) METHOD AND SYSTEM FOR IDENTIFYING NETWORK PATHS

(75) Inventors: Gary L. Campbell, Allen, TX (US); Oommen Mathews, Allen, TX (US)

(73) Assignee: Verizon Patent And Licensing Inc., Basking Ridge, NJ (US)

( * ) Notice: Subject to any disclaimer, the term of this patent is extended or adjusted under 35 U.S.C. 154(b) by 135 days.

(21) Appl. No.: 12/208,414

(22) Filed: Sep. 11, 2008

(65) Prior Publication Data
US 2010/0061264 A1 Mar. 11, 2010

(51) Int. Cl.
*G01R 31/08* (2006.01)
(52) U.S. Cl. .......................... 370/253
(58) Field of Classification Search .......... 370/203, 370/229–240, 241–253, 254–258, 298–306, 370/351–356, 357–395, 395.1, 395.2, 395.21, 370/395.3, 395.31, 395.32, 395.4, 395.41, 370/395.42, 395.43, 395.5, 395.52, 395.53, 370/395.54, 395.6, 395.61, 396–411, 412–429, 370/503–520
See application file for complete search history.

(56) References Cited

U.S. PATENT DOCUMENTS

| | | | | |
|---|---|---|---|---|
| 4,349,702 | A * | 9/1982 | Joel, Jr. ........................ | 340/2.71 |
| 5,450,394 | A * | 9/1995 | Gruber et al. ................. | 370/253 |
| 5,475,857 | A * | 12/1995 | Dally ............................. | 712/11 |
| 6,678,264 | B1 * | 1/2004 | Gibson ......................... | 370/352 |
| 6,937,603 | B1 * | 8/2005 | Miao ......................... | 370/395.62 |
| 7,002,917 | B1 * | 2/2006 | Saleh ............................ | 370/238 |
| 7,088,706 | B2 * | 8/2006 | Zhang et al. ................. | 370/352 |
| 7,154,858 | B1 * | 12/2006 | Zhang et al. ................. | 370/252 |
| 7,308,198 | B1 * | 12/2007 | Chudak et al. ................ | 398/58 |
| 7,586,853 | B2 * | 9/2009 | Bonsma et al. ............... | 370/254 |
| 2003/0058826 | A1 * | 3/2003 | Shearer, III ................... | 370/338 |
| 2005/0036487 | A1 * | 2/2005 | Srikrishna .................... | 370/389 |
| 2005/0076137 | A1 * | 4/2005 | Tang et al. .................... | 709/238 |
| 2006/0153089 | A1 * | 7/2006 | Silverman .................... | 370/252 |
| 2006/0173855 | A1 * | 8/2006 | Turner et al. .................. | 707/10 |
| 2008/0008203 | A1 * | 1/2008 | Frankkila et al. ............ | 370/412 |
| 2008/0186902 | A1 * | 8/2008 | Furukoshi et al. ........... | 370/315 |
| 2008/0279101 | A1 * | 11/2008 | Wu et al. ...................... | 370/235 |
| 2009/0010647 | A1 * | 1/2009 | Jenkins et al. ................ | 398/57 |

* cited by examiner

*Primary Examiner* — Kwang B Yao
*Assistant Examiner* — Jung-Jen Liu

(57) ABSTRACT

A method and system of an embodiment may include receiving network information associated with one or more network links, one or more network nodes, and a network hub, identifying at least two network paths from at least one of the one or more network nodes to the network hub based on the network information. Identifying at least two network paths from at least one of the one or more network nodes to the network hub based on the network information may include determining a number of hops for each identified network path, determining a latency of each link for each identified network path, summing the latencies of each link for each identified network path to calculate a total network path latency, and determining a ranking of the network paths based at least in part on the number of hops and the total network path latency.

21 Claims, 5 Drawing Sheets

METHOD AND SYSTEM FOR IDENTIFYING NETWORK PATHS

BACKGROUND INFORMATION

Network users may use private networks to connect multiple locations of an organization, a corporation or other entity. Planning, provisioning and building private networks may require the design and analysis of the private network backbone. In order to enable network traffic routing and network provisioning, routing tables and other network path information may be created by network planners. Generating routing tables and other network path information may be a manual, time consuming, and error prone process.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

An exemplary embodiment provides a network analysis system. The network analysis system may identify one or more network paths between two or more network nodes of a network.

The description below identifies servers, mobile devices, and network elements that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, mobile devices, and network elements, etc.) separately. The functions described as being performed at various components may be performed at other components, and the various components may be combined and/or separated. Other modifications also may be made.

Figure 1:
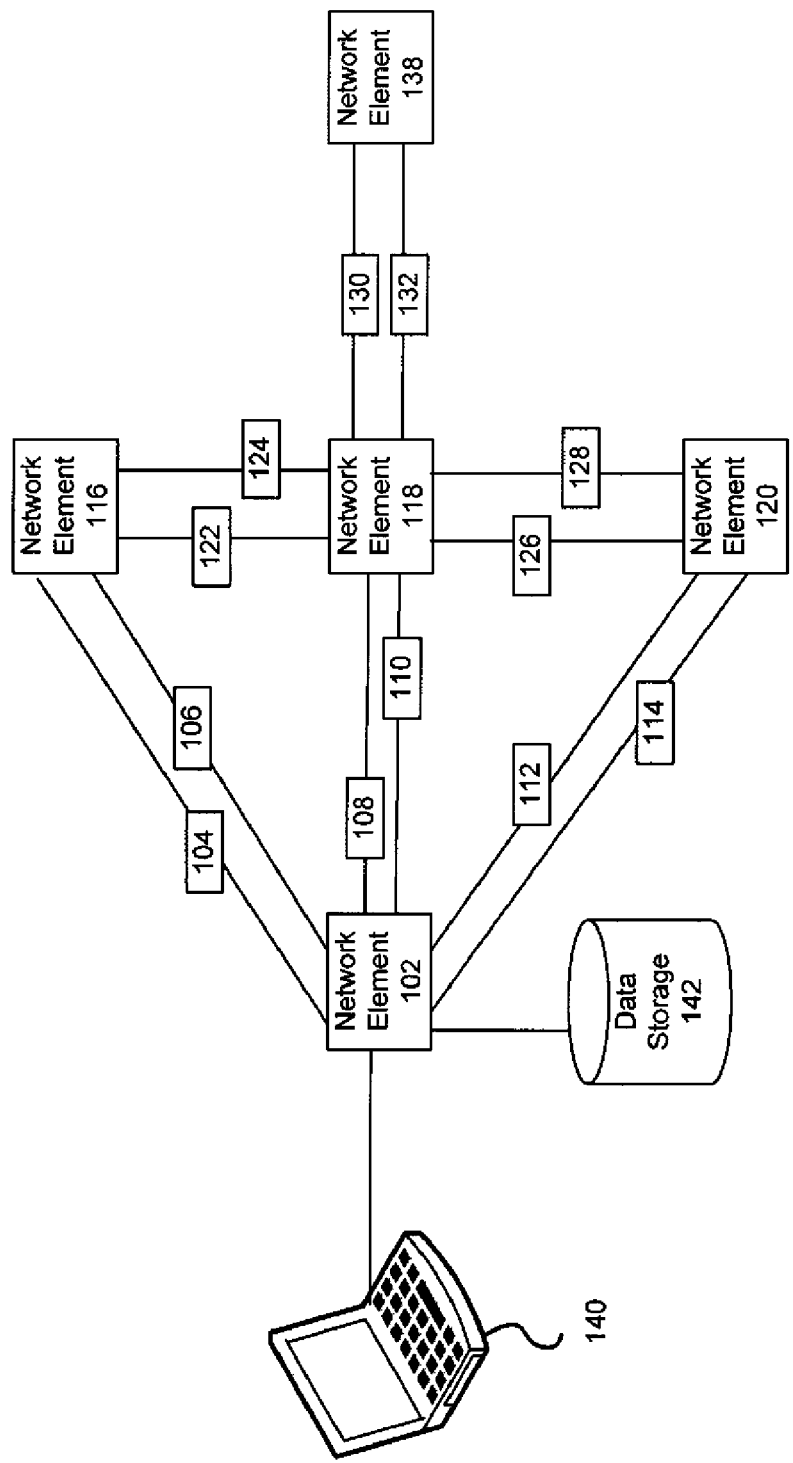
FIG. 1 is a block diagram of a network analysis system, in accordance with an exemplary embodiment.

Referring to FIG. 1, a block diagram of a network analysis system in accordance with an exemplary embodiment is illustrated. System 100 illustrates an exemplary system for analysis of a network, such as a private network. It is noted that System 100 is a simplified view of a network and may include additional elements that are not depicted. As illustrated, network elements 102, 116, 118, 120 and 138 may be communicatively coupled by network paths 104, 106, 108, 110, 112, 114, 122, 124, 126, 128, 130 and 132. Network elements 102, 116, 118, 120 and 138 may be communicatively coupled to other devices such as data storage 142 and the computer 140.

Network elements 102, 116, 118, 120 and 138 may transmit and/or receive data via network paths 104, 106, 108, 110, 112, 114, 122, 124, 126, 128, 130, and 132. The data may be transmitted and/or received utilizing a standard telecommunications protocol or a standard networking protocol. For example, data may be transmitted and/or received using Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data. Data may be transmitted and/or received wirelessly or may utilize cabled network connections or telecom connections such as an Ethernet RJ45/Category 5 Ethernet connection, a fiber connection, a traditional phone wireline connection, a cable connection or other wired network connection. Network elements 102, 116, 118, 120 and 138 may use standard wireless protocols including IEEE 802.11a, 802.11b and 802.11g. Network elements 102, 116, 118, 120 and 138 may also be communicatively coupled via protocols for a wired connection, such as an IEEE Ethernet 802.3.

Network elements 102, 116, 118, 120 and 138 may be one or more routers, switches, hubs, and/or other network connectivity devices. Network elements 102, 116, 118, 120 and 138 may include one or more processors (not shown) for recording, transmitting, receiving and/or storing data. Although network elements 102, 116, 118, 120 and 138 are each depicted as single network connectivity devices, it should be appreciated that the contents of network elements 102, 116, 118, 120 and 138 may be combined into fewer or greater numbers of network connectivity devices and may be connected to one or more data storage systems, such as data storage 142. Furthermore, network elements 102, 116, 118, 120 and 138 may be local, remote, or a combination thereof to each other. Network elements 102, 116, 118, 120 and 138 may be different portions of a network such as edge nodes, core nodes, customer premise equipment, a hubbing node, edge devices, and integrated access devices or other network connectivity devices.

Network elements 102, 116, 118, 120 and 138 may provide application programming interfaces (APIs), interface tables, remote procedure calls (rpcs), web services, Extensible Markup Language (XML) based interfaces, Simple Object Access Protocol (SOAP) based interfaces, common request broker architecture (CORBA) based interfaces and other interfaces for sending or receiving network information.

Network paths 104, 106, 108, 110, 112, 114, 122, 124, 126, 128, 130, and 132 may be one or more network connections utilized to provide private network connectivity to one or more users. For example, network paths 104, 106, 108, 110,

112, 114, 122, 124, 126, 128, 130, and 132 may be network connections utilizing Ethernet, Multi-Protocol Label Switching (MPLS) based Ethernet, Asynchronous Transfer Mode (ATM), Synchronous Optical Networking (SONET), digital subscriber line (DSL), asymmetric digital subscriber line (ADSL), symmetric digital subscriber line (SDSL), fiber to the premises (FTTP), cable modem broadband, leased line, integrated services digital network (ISDN), dial-up, satellite, wireless networking, broadband over power lines and/or other network technologies. In some embodiments, network paths 104, 106, 108, 110, 112, 114, 122, 124, 126, 128, 130, and 132 may be logically combined using link aggregation such as Ethernet bonding, channel bonding, trunking, port trunking, and/or an IEEE 802.3ad compliant technique.

Data storage 142 may be network accessible storage and may be local, remote, or a combination thereof to network elements 104, 106, 108, 110, 112, 114, 122, 124, 126, 128, 130, and 132. Data storage 142 may utilize a redundant array of inexpensive disks (RAID), a redundant array of inexpensive nodes (RAIN), tape, disk, a storage area network (SAN), and/or other computer accessible storage. In one or more embodiments, Data storage 142 may be a database, such as an Oracle database, a Microsoft SQL Server database, a DB2 database, a MySQL database, a Sybase database, an object oriented database, a hierarchical database, and/or another database. Data storage 142 may store network path information identifying one or more network paths between one or more network elements. Network path information may include edge network equipment information, core network equipment information, customer premise equipment information, network routing information, a hop count for a network path, bandwidth information associated with a network path, congestion information associated with a network path, latency information associated with a network path, and/or quality of service information associated with a network path. Data storage 142 may store user specified parameters such as a hub node id, a maximum number of paths or routes to be identified, a maximum number of hops allowable or desired on identified routes, a conversion factor to convert distance calculated from a grid system to mileage on a network path, a number to utilize when calculating link latency for route miles, and/or a floor or minimum amount of link latency to be assumed when estimating, a maximum permissible or desirable link latency.

Data storage 142 may store files which may contain network information utilized to model a network and identify network paths, such as a file of locations utilizing grid based data. The locations may provide vertical and horizontal coordinates on a standardized grid, such as the V&H coordinate system developed by AT&T which contains vertical and horizontal coordinates of one or more locations. Another file stored by data storage 142 may include a file identifying traffic producing remote nodes. Data storage 142 may additionally store a file identifying network links and may optionally identify route miles for one or more of the network links.

Data storage 142 may store network traffic information specifying a network ingress and a network egress for network traffic on a private network backbone on a network path. Network traffic information may also specify one or more attributes of the network traffic. Network traffic information may include minimum required bandwidth required for the network traffic, quality of service metrics for the traffic, an ingress point of network traffic, an egress point of network traffic, customer information associated with network traffic and other data.

Data storage 142 may store data received from user input, a network management system, a network provisioning system, a management information base, a network services ordering system, a database, a file, a web service, and/or an application programming interface. In one or more embodiments, data storage 142 may be a management information base.

The computer 140 may be a desktop computer, a laptop computer, a server or other computer capable of performing private network backbone analysis. The computer 140 may receive data from user input, a network management system, a network provisioning system, a management information base, a network services ordering system, a database, a file, a web service, and/or an application programming interface. The computer 140 may query other systems and/or local or remote storage such as data storage 142 to obtain network information.

The computer 140 may model a network which may provide one or more private network backbones to one or more users. The computer 140 may utilize network path information to create one or more models of network topology including nodes, links, resources and/or other network infrastructure. The computer 140 may model network topology attributes such as the bandwidth of a link, the bandwidth of a node, the bandwidth information associated with a network path, congestion information associated with a network path, latency information associated with a network path, and/or quality of service information associated with a network path. A model may be stored in a memory or in other storage, such as data storage 142.

The computer 140 may utilize data associated with network links to determine classes of links. For example, a first class of links may contain links between two provider edge nodes. A second class of links may contain links between a provider edge node and a provider backbone node. A third class of links may contain links between two provider backbone nodes. For example, a link class "0" may be defined which may contain one or more links between provider edge (PE) nodes. A second link class, a link class "1" may be defined which may contain one or more provider edge (PE) node to provider backbone (P1) node links. A third link class, a link class "2" may be defined which may contain one or more provider backbone (P1) node to provider backbone (P1) node links. In one or more embodiments, the classification of links may enable the identification of one or more network paths which utilize a particular type of link. The classification of links may also enable the identification of one or more network paths which avoid a particular type of link. For example, in a system identifying one or more network paths to provision a private network backbone on a provider network, computer 140 may avoid the use of provider edge to provider edge links (class 0 links). In this example, computer 140 may prefer utilization of provider edge to provider backbone links and provider backbone to provider backbone links (classes 1 and 2, respectively). In some embodiments, a provider edge to provider edge node link may be utilized only if it represents a single hop link from a first node to the hub. In other embodiments, computer 140 may not classify links or may ignore classification of links when identifying network paths. Links may also be classified using other characteristics, such as bandwidth, network traffic, length or other link attributes.

The computer 140 may utilize the model or other data to identify optimal network paths from one or more user traffic origination point or network ingress to a user traffic destination point or network egress. The computer 140 may utilize a listing of network infrastructure, such as data providing information about traffic producing nodes and data providing information about network links, in order to determine one or more network paths. For example, the computer 140 may receive network information associated with one or more network links, one or more network nodes, and a network hub, which may identify a network path from at least one of the one or more network nodes to the network hub, may determine a number of hops on the network path, may determine a latency of one or more links of the network path, and may determine a ranking of the network path based at least in part on the number of hops and the latency of the network path. The computer 140 may compare the number of hops on the network path with a specified number of hops desired or allowed per network path. The specified number of hops desired and/or allowed may be a user parameter which may be provided via a file, an interface, or input by a user. If the number of hops exceeds the specified number of hops, the computer 140 may discard the path, may mark the path as ineligible or may otherwise handle the path. The computer 140 may compare the network path latency with a specified maximum network path latency. The specified maximum network path latency may be a user parameter which may be provided via a file, an interface, or input by a user. If the network path latency exceeds the specified maximum path latency, the computer 140 may discard the path, mark the path as ineligible or otherwise handle the path.

The computer 140 may calculate the hops of a network path by identifying a network path utilizing data, such as data on data storage 142, containing information about traffic producing remote nodes, network links, network path or route miles, grid data (e.g., data containing vertical and horizontal coordinates of locations such as network node locations), and other network data. For example, the computer 140 may iteratively examine nodes in a data file and corresponding link information to identify one or more network paths. The computer 140 may utilize a specified hub id to identify a node that is a hubbing node. This hub or hubbing node may be one end of a network path. Starting with a first node, the computer 140 may examine one or more links looking for a link which is connected on one end to the first node and on the other end to the hubbing node. A direct link from the first node to the hub may be a single hop network path. In one or more embodiments, the computer 140 may iterate through data representing one or more links and may skip links which do not connect directly from a first node to the specified hub. Thus, in one or more embodiments, the computer 140 may identify all network paths which are single hop paths first, and may ignore or skip links which do not connect directly from a first node to the hub. For example, if network element 102 is a first node and network element 120 is the identified hub, the computer 140 may identify network paths 112 and 114 as single hop network paths. If network paths 112 and/or 114 are determined to have a latency greater than a specified amount, the network path may be ignored. For example, if the specified maximum latency is 50 milliseconds and network path 112 is determined to have a latency of 52 milliseconds, network path 112 may be ignored. Similarly if network path 114 is determined to have a latency of 50 milliseconds or less, network path 114 may be stored or marked as an identified network path. In this example, the computer 140 may ignore network paths 104, 106, 108, and 110 as paths containing more than one hop. The computer 140 may continue identifying network pats until all network paths are identified or until a specified maximum number of network paths are identified. A maximum number of network paths specified may be a user or system parameter and may be inputted, specified in a file, provided by a user interface, or provided by another interface.

The computer 140 may calculate the latency of a network link by using data providing network route miles. For example, the computer 140 may divide the total number of route miles for a link by 100 and multiply it by a specified link latency factor (e.g., 1.0) to obtain the latency for that link. The computer 140 may repeat this for each link of a network path. In some embodiments, the computer 140 may utilize miles calculated from a grid instead of actual network route miles. For example, a standardized grid may provide coordinates, such as vertical and horizontal coordinates for the locations of two or more nodes on a network path. The location of two nodes on the network path may be utilized to determine the length of a network link between the two nodes. The computer 140 may utilize a formula to calculate the distance between two network nodes on a grid, such as: $((V1-V2)^2 + (H1-H2)^2/10)^{1/2}$. In this example, V1 may be a vertical coordinate of a first node (one endpoint of a link), V2 may be a vertical coordinate of a second node of a link, H1 may be a horizontal coordinate of a node, and H2 may be the horizontal coordinate of the second node. This length may be converted from a distance on the grid to a distance of network route miles using a conversion factor. The conversion factor may be a user specified parameter which may be input, provided via a file, via a user interface or by other interfaces. The conversion factor may be a specified multiplier (e.g., 1.5) which may be multiplied against the link miles calculated from the grid to determine calculated network route miles for the link. This calculated network route miles number may then be utilized to determine the latency for the link by dividing the calculated network route miles number by 100 and multiplying it by a specified link latency factor. When calculating latency, the computer 140 may utilize a specified minimum amount of latency. If a calculated latency is less than a specified minimum amount of latency, the computer 140 may utilize the number for the specified minimum amount of latency instead. The specified minimum amount of latency may compensate for delays other than link length, such as network node processing time to relay a signal. The computer 140 may repeat latency calculations for each link of a network path. In one or more embodiments, the computer 140 may sum the latencies of a network path by adding the latencies of each network link in the network path. Latency may be measured in milliseconds or in other appropriate measuring units.

In some embodiments, after the computer 140 has identified one or more single hop network paths for a first node, the computer 140 may repeat the process for a second node. After the computer 140 has identified the single hop network paths for one or more nodes, the computer 140 may begin identifying two hop network paths for one or more nodes. In some embodiments, the computer 140 may identify one or more single hop network paths for all traffic producing edge nodes prior to identifying network paths with more than one hop. In one or more embodiments, after identifying one or more single hop network paths the computer 140 may begin identifying two hop network paths for a first node. In some embodiments, no suitable single hop network paths may exist for one or more of the nodes.

After identifying one or more single hop network paths for one or more network nodes, the computer 140 may identify two hop network paths. The computer 140 may identify a provider edge node, which may be a network traffic origination point and may be considered a first node on a network path. The computer 140 may then identify a second node which is not the hubbing node and is not the first node. The computer 140 may then iterate through data associated with one or more links to identify a link between the first node and the second node. If a link is not found between the first and second network nodes the computer 140 may identify another network node to use as a second node and may repeat the process. If a link is found between the first and second nodes, the computer 140 may then iterate through data associated with one or more links to identify a link between the second node and the hub or hubbing node. If a link is not found between the second network node and the nub, the computer 140 may identify another node to utilize as a second network node and may repeat the process. If a link is found between the second network node and the hub, then the computer 140 may determine the latency for the network path. The computer 140 may calculate the latency for each identified link for each hop in the network path and may sum the latencies to determine a total latency for the network path. If the total latency is less than a specified maximum path latency, the network path may be marked, stored, or otherwise identified as a network path choice for the first node. In some embodiments, a network path may be stored regardless of the latency and the latency may be utilized only to rank the network path. In some embodiments, the computer 140 may repeat the path identification process for the first node until a specified maximum number of paths is identified or until all network data has been evaluated. After identifying one or more two hop network paths for the first network node, the computer 140 may identify another network node to utilize as a first network node and may repeat the network path identification process.

After identifying one or more network paths with two hops, the computer 140 may repeat the path identification process to identify three hop network paths for one or more network nodes. This may involve the computer 140 identifying a first node, identifying a second node connected to the first node, and identifying a third node connected to the second node wherein the third node is also connected to the hub. The computer 140 may sum the latencies to determine if the sum of the latencies is less than or equal to a specified maximum network path latency. In one or more embodiments, the computer 140 may repeat the path identification process incrementally until one or more paths with "N" hops have been identified for one or more nodes, where "N" is a specified maximum number of hops. In other embodiments, the number of hops may not be limited and network path identification may continue until a maximum number of network paths is identified for each node or until it is determined that paths beyond a certain number of hops exceed a specified maximum network path latency.

In one or more embodiments, the computer 140 may apply a ranking formula to one or more identified network paths. For example, in one or more embodiments, a network path's rank may be determined by the sum of the latencies of its links plus the number of hops in the path multiplied by 100. This formula may give lower scores to more preferable paths. In this embodiment, the ranking formula may ensure that network paths with fewer hops are given better rankings than network paths with greater numbers of hops. The rankings of network paths may be used to determine which network paths are utilized for routing tables, which network paths are preferred, and/or which network paths are listed in one or more reports. The computer 140 may utilize a number or a percentage of the top ranked paths to generate one or more routing tables for a network node.

The computer 140 may provide a user interface to a model. A user interface to a model may enable a user to input data, edit data or view data related to network traffic and/or one or more network paths. A network model may display a map of available network paths for one or more nodes. In one or more embodiments, network paths may display rankings, link latencies or other network information.

The computer 140 may produce a report, a listing, a display, a text message, an email or otherwise provide a listing of available network paths. Available paths may be listed in order of ranking, by available bandwidth, latency, or other network metrics. Available paths may also be listed in other orders such as alphabetically by node name, link name or in other orders. In some embodiments, only network paths with latencies less than a specified maximum path latency will be listed. Additionally network paths with a number of hops greater than a specified maximum number of hops may not be listed.

The various components of system 100 as shown in FIG. 1 may be further duplicated, combined and/or integrated to support various applications and platforms. Additional elements may also be implemented in the systems described above to support various applications.

Figure 2:
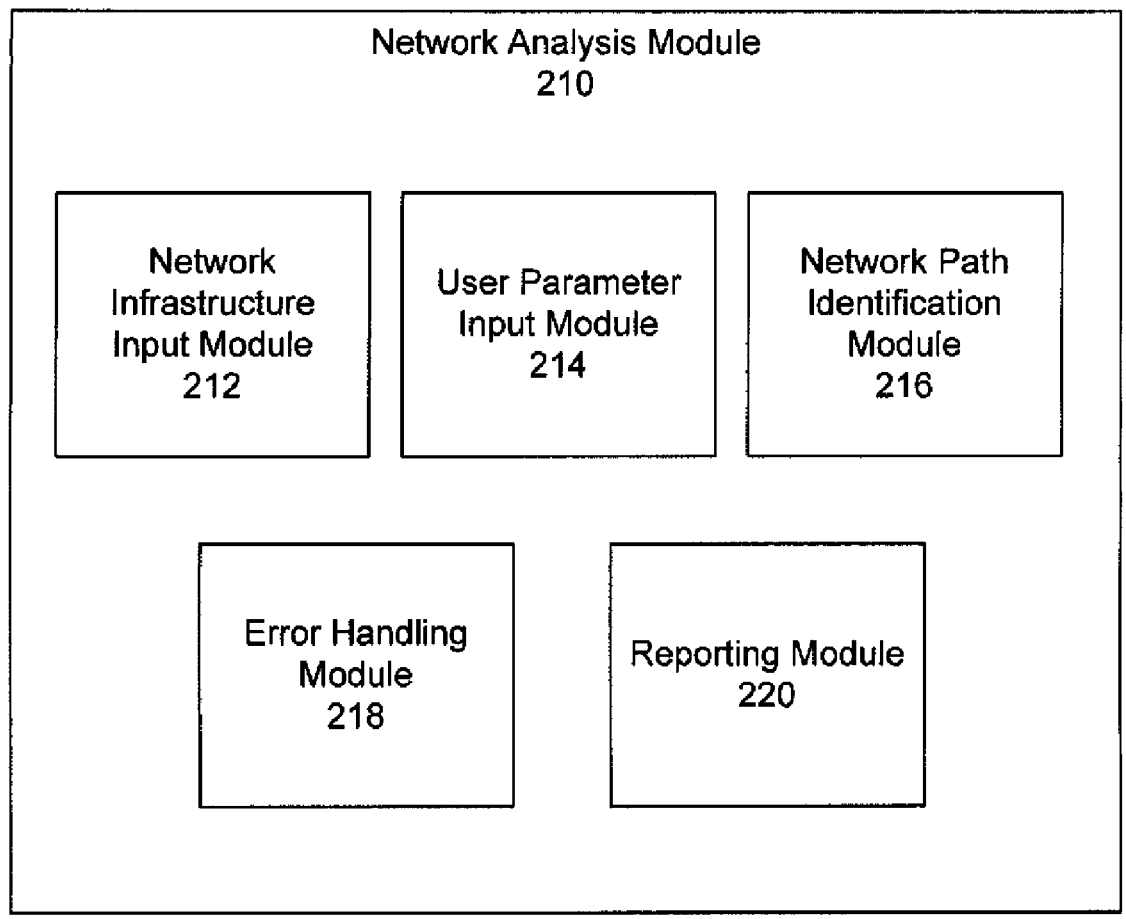
FIG. 2 depicts a block diagram of a module for analyzing a network, in accordance with an exemplary embodiment.

Referring to FIG. 2, a block diagram of module for analyzing a network is depicted, in accordance with an exemplary embodiment. As illustrated, FIG. 2 may contain network analysis module 210, network infrastructure input module 212, user parameters input module 214, network path identification module 216, error handling module 218, and reporting module 220.

Network analysis module 210 may utilize one or more components to analyze network data and identify network paths.

Network infrastructure input module 212 may accept user inputs via a user interface, read data files, and accept network data via other interfaces. Network infrastructure data may include data associated with network nodes, network links and/or other network elements. Data may identify edge network nodes, backbone nodes, and links associated with such nodes.

User parameters input module 214 may accept user specified parameters. User specified parameters may determine one or more factors utilized in identifying network paths, ranking network paths, generating routing tables, reporting or other network analysis activities. For example, user specified parameters may include, a maximum number of paths to identify for each node, a maximum number of hops permitted per network path, a maximum amount of latency to permit per path, a minimum amount of latency to permit when calculating a link latency, a conversion factor to utilize when converting from grid miles to network route miles, a conversion factor to utilize when determining the link latency for a calculated network path length, and/or a hub node identifier to identify which of the nodes to utilize as a hub when identifying network paths.

Network path identification module 216 may analyze data received by network infrastructure input module 212 and may identify one or more network paths for one or more network nodes. Network paths may be optimal network paths based on the data and based on one or more user parameters received by user parameter input module 214. Network paths may be paths utilized by a traffic producing edge network node on a private backbone to a hub node. In one or more embodiments, network paths of a modeled network may be identified. In some embodiments, network paths of an existing network may be identified.

Error handling module 218 may handle one or more errors encountered when analyzing network data. For example, error handling module 218 may handle errors related to data input format, no available network paths, reporting errors, or other errors.

Reporting module 220 may produce one or more reports containing network path information. Reports may be printed, web based, sent in a text message or email, or stored as a file. Formatting options may enable the generation of one or more routing tables.

Figure 3:
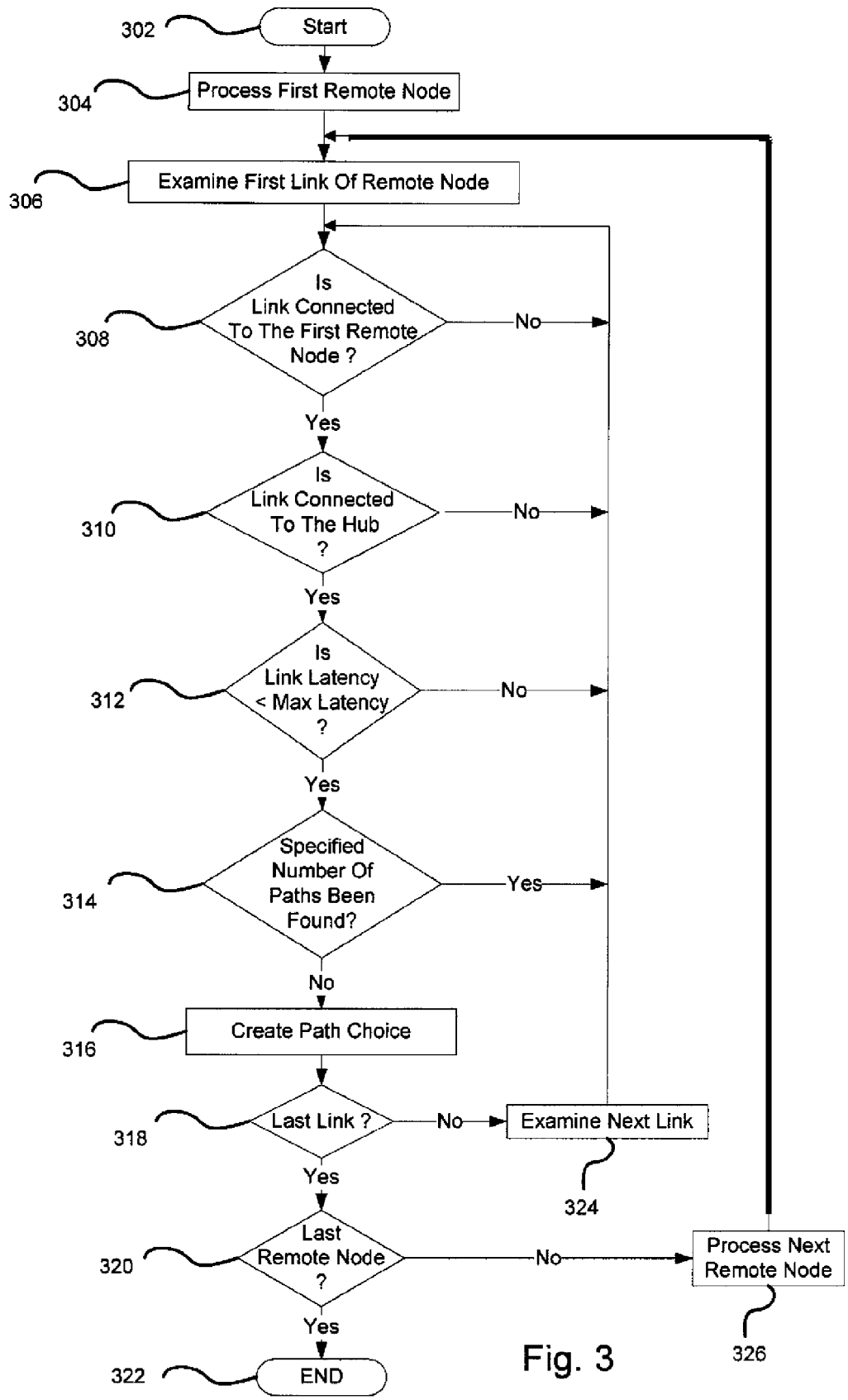
FIG. 3 depicts a flowchart of a method for identifying one or more network paths, in accordance with an exemplary embodiment.

FIG. 3 illustrates a flowchart of a method 300 for identifying a network path, in accordance with an exemplary embodiment. This exemplary method 300 is provided by way of example, as there are a variety of ways to carry out the method. The method 300 shown in FIG. 3 can be executed or otherwise performed by one or a combination of various systems. The method 300 as described below may be carried out by the network analysis system 100 shown in FIG. 1 and network analysis module 210 shown in FIG. 2 by way of example, and various elements of the FIGS. 1 and 2 are referenced in explaining exemplary method 300 of FIG. 3. Each block shown in FIG. 3 represents one or more processes, methods or subroutines carried out in exemplary method 300. Referring to FIG. 3, exemplary method 300 may begin at block 302.

At block 304, analysis of a first remote node may occur. A remote node may be an edge node which may be a traffic producing node. The first remote node may be chosen at random from data containing one or more remote nodes. In some embodiments, a first node may be specified, nodes may be iterated through alphabetically, numerically by node identifier, or in another order.

At block 306, a link associated with the first remote node may be analyzed. This may involve determining whether the link is classified as a link between two edge nodes, between two core nodes (e.g., provider backbone nodes), or between an edge node and a core node.

At block 308, the method 300 may determine whether a first identified link is connected to the first remote node. If the link is connected to the first node the method may continue at block 310. If the link is not connected to the first node, the method 300 may continue at block 324.

At block 310, the method 300 may determine whether the first identified link is coupled to the hub. The hub or hubbing node may be identified by a specified node identifier. If the link is connected to the hub, the method may continue at block 312. If the link is not connected to the hub, the method 300 may continue at block 324.

At block 312, the method 300 may determine if the latency of the link is less than a specified maximum permissible link latency. In some embodiments, the method 300 may utilize network data providing a link length to calculate the latency. The method may multiply the link length by a specified multiplier to determine the latency. The link length may be calculated by using grid data contain coordinates of one or more node locations. If a link latency is less than or equal to a specified maximum permissible latency the method 300 may continue at block 314. If the link latency is greater than the specified maximum permissible link latency, the method may continue at block 324.

At block 314, the method 300 may determine whether a specified maximum number of network paths or routes have been identified. If the specified maximum number of network paths have not been identified the method 300 may continue at block 316. If the specified maximum number of paths have been identified, the method 300 may continue at block 324.

At block 316, the method 300 may create a route choice identifying the route. Creating a route choice may include storing a route, marking a route, adding route information to a routing table, reporting a route, and/or ranking a route.

At block 318, the method 300 may determine whether other links are available for analysis. If so, the method 300 may continue at block 324. If no other links are available, the method 300 may continue at block 320.

At block 320, the method 300 may determine whether another remote node should be analyzed. If so, the method 300 may continue at block 326. If no other network nodes are to be analyzed, the method 300 may end at block 322.

At block 324, the method 300 may analyze a second or subsequent network link to identify a network path for the network node. The method 300 may thus repeat the analysis for the second or subsequent network link at block 308.

At block 326, the method 300 may analyze a second or subsequent network node. The method 300 may identify one or more network paths for this second or subsequent network node. Thus the method 300 may repeat the network path identification process starting at block 306.

Figure 4:
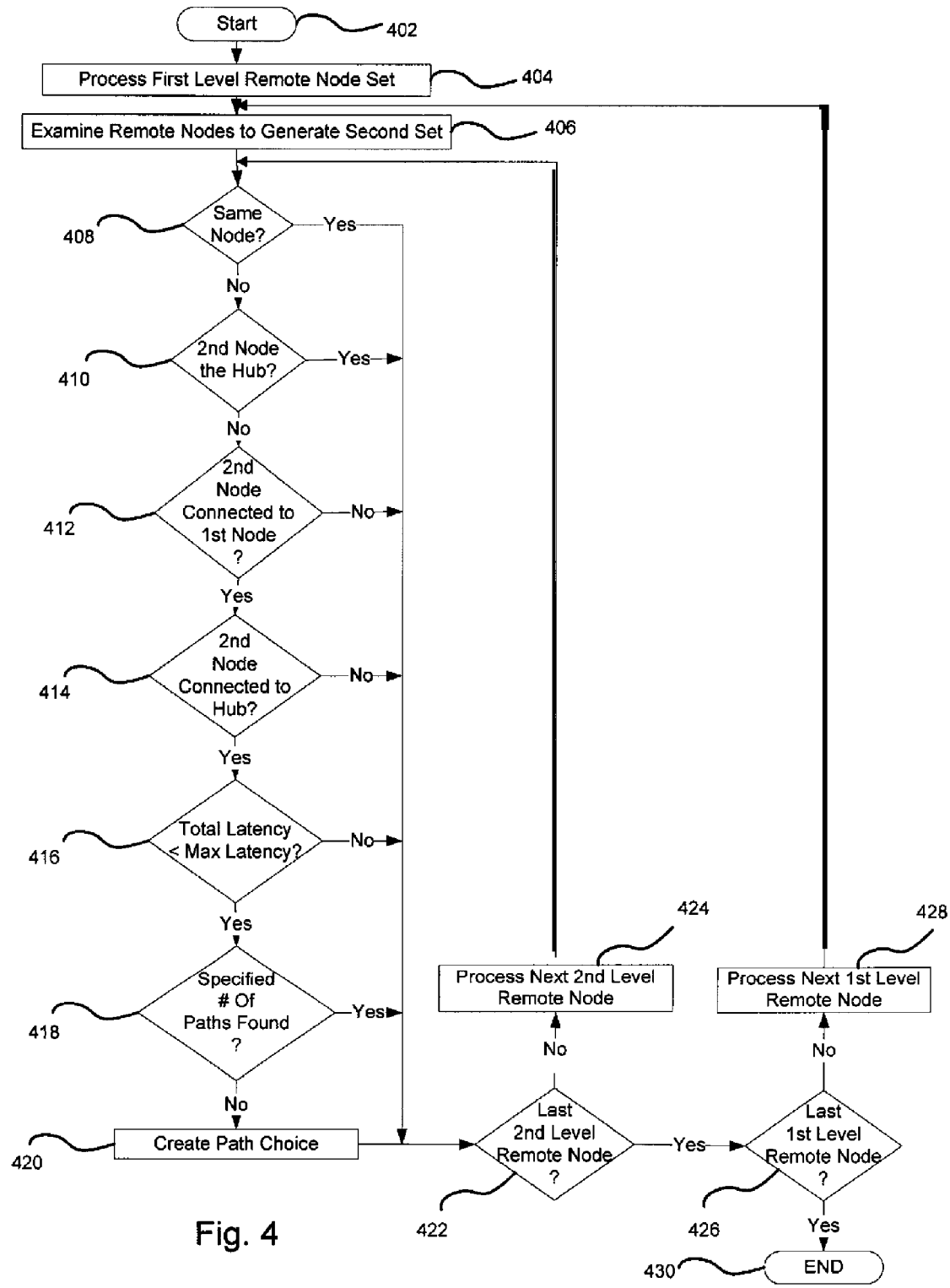
FIG. 4 depicts a flowchart of a method for identifying one or more network paths, in accordance with an exemplary embodiment.

FIG. 4 illustrates a flowchart of a method 400 for identifying a network path, in accordance with an exemplary embodiment. This exemplary method 400 is provided by way of example, as there are a variety of ways to carry out the method. The method 400 shown in FIG. 4 can be executed or otherwise performed by one or a combination of various systems. The method 400 as described below may be carried out by the network analysis system 100 shown in FIG. 1 and network analysis module 210 shown in FIG. 2 by way of example, and various elements of the FIGS. 1 and 2 are referenced in explaining exemplary method 400 of FIG. 4. Each block shown in FIG. 4 represents one or more processes, methods or subroutines carried out in exemplary method 400. Referring to FIG. 4, exemplary method 400 may begin at block 402.

At block 404, the method 400 may analyze network nodes to identify one or more single hop network paths for one or more nodes.

At block 406, the method 400 may analyze network nodes to identify one or more two hop network paths for one or more nodes.

At block 408, the method 400 may begin identifying the one or more two hop network paths. The method 400 may iterate through a set of nodes. In one or more embodiments, the set of nodes may be represented by data stored in an array. The method may identify a second node and may determine whether a second node is the same as the first node. If the second node is the same as the first node, the method 400 may continue at block 422. If the second node is not the same as the first node the method may continue at block 410.

At block 410, the method 400 may determine if the second node is a hub. If the second node is the hub the method may continue at block 422. If the second node is not the hub, the method may continue at block 412.

At block 412, the method 400 may determine whether the second node is connected to the first node. The method 400 may iterate through one or more links to identify a link between the first node and the second node. If the second node is not connected to the first node the method may continue at block 422. If the second node is connected to the first node, the method may continue at block 414.

At block 414, the method 400 may determine whether the second node is connected to the hub. The method 400 may utilize a specified hub node identifier to determine whether a link terminates at the hub. If the second node is connected to the hub, the method 400 may continue at block 416. If the second node is not connected to the hub, the method 400 may continue at block 422.

At block 416, the method 400 may determine if the total latency of the network path is less than a specified maximum network path latency. The method 400 may sum the latencies of the network links to determine a total network path latency. This sum may be compared against a user specified or system provided maximum network path latency. If the network path latency is less than or equal to a specified maximum path latency the method may continue at block 418. If the network path latency is greater than a specified maximum network path latency the method may continue at block 422.

At block 418, the method 400 may determine whether a specified maximum number of network paths has been found for a particular node. If a specified maximum number of network paths has been found, the method may continue at block 422. If a specified maximum number of network paths has not been found, the method may continue at block 420.

At block 420, the method 400 may mark the identified network path as a path choice. The identified network path may be recorded, transmitted or otherwise identified as a network path choice for the first network node. In one or more embodiments, the network path will be ranked.

At block 422, the method 400 may determine if another node is available for analysis as the second node in a two hop network path. If another second level node is available the method may continue at block 424. If another second level node is not available the process may continue at block 426.

At block 424, the method 400 may identify another network node to use as a second hop in a network path. The method may repeat at block 408.

At block 426, the method 400 may determine if any other nodes should be analyzed as a first node in a two hop network path. If other nodes are to be analyzed the method may continue at block 428. If no other nodes are to be analyzed the method may continue at block 430.

At block 428, the method 400 may identify a node to use as the first node in a two hop network path. The method 400 may then continue at block 406.

At block 430, the method 400 may end.

Figure 5:
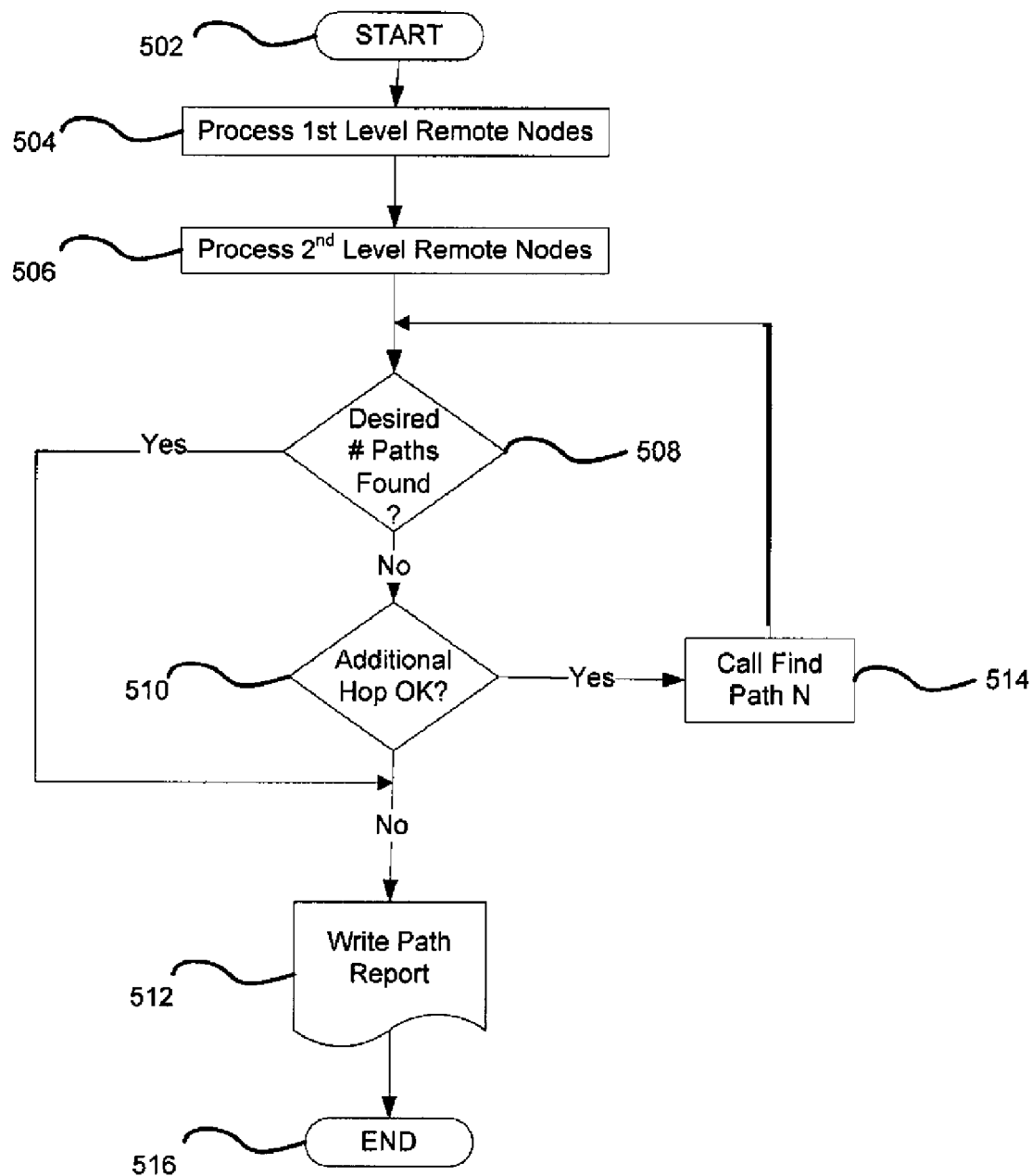
FIG. 5 depicts a flowchart of a method for identifying one or more network paths, in accordance with an exemplary embodiment.

FIG. 5 illustrates a flowchart of a method 500 for identifying a network path, in accordance with an exemplary embodiment. This exemplary method 500 is provided by way of example, as there are a variety of ways to carry out the method. The method 500 shown in FIG. 5 can be executed or otherwise performed by one or a combination of various systems. The method 500 is described below may be carried out by the network analysis system 100 shown in FIG. 1 and network analysis module 210 shown in FIG. 2 by way of example, and various elements of the FIGS. 1 and 2 are referenced in explaining exemplary method 500 of FIG. 5. Each block shown in FIG. 5 represents one or more processes, methods or subroutines carried out in exemplary method 500. Referring to FIG. 5, exemplary method 500 may begin at block 502.

At block 504, the method may analyze first level nodes. This may involve identifying one or more single hop network paths for one or more network nodes as described in reference to FIG. 3 above.

At block 506, the method may analyze second level nodes. This may involve identifying one or more two hop network paths for one or more network nodes as described in reference to FIG. 4 above.

At block 508, the method may determine whether a desired number of network paths has been found for one or more network nodes. For example, referring to FIG. 1, if network element 102 were a first level network node and network element 138 were a hub there may be no one hop network paths available. There may be only a few two hop network paths between network element 102 and network element 138 (e.g., utilizing network element 118 and network paths 108, 110, 130, and/or 132). At block 508 if a specified maximum number of network paths has not been found the method 500 may continue at block 510. If the specified maximum number of network paths has been found, the method 500 may continue at block 512.

At block 510, the method may determine whether identifying network paths with an additional hop is permissible and/or desirable. A specified maximum number of network hops may be provided by a user parameter, a system parameter or another input. If an additional hop is permissible, the method may continue at block 514. If an additional hop is not permissible the method may continue at block 512.

At block 512, the method may generate a report listing one or more network paths. In some embodiments network paths may be ranked and/or sorted. Rankings and/or sorting may be done by the number of network hops of a network path, by the network path latency, and/or other criteria.

At block 514, the method may begin identifying one or more network paths with an additional hop. For example, referring again to FIG. 1, if network element 102 were a first network node (e.g., an edge network node generating traffic) and network element 138 were a hub, the method 500 may identify one or more three hop network paths. Network paths may be identified utilizing network element 116, network element 118 and network paths 104, 106, 122, 124, 130 and 132.

At block 516, the method may end.

As an example, in one or more embodiments, Table 1 may illustrate a table of network nodes and corresponding routes or network paths identified for the network nodes to an identified hub with a network node name of WAEPE. Table 1 is exemplary and may contain a greater number or fewer number of network nodes and/or network paths. The first column may provide a reference number for the purposes of this example. The second column may provide a network node name for which a network path or route may have been identified. In this example, network node names may have a specified number of characters such as five and the ending two characters may indicate a node type (e.g., PE may indicate provider edge, P1 may indicate backbone). The third column may provide one or more identified network paths which may have been identified for a fewest amount of hops to a greatest amount of hops. Network paths may be a concatenated string of characters starting with the first node name followed by node name on the network path and ending with the node name of the identified network hub. Referring to row 1 of Table 1, node name BDGPE, a provider edge node, may have three identified network paths listed in order from fewest hops to greatest. Path BDGPEWAEP1WAEPE may represent a two hop path which starts at node BDGPE traversing a link or a hop to node WAEP1 and then traversing a second hop to terminate at network hub WAEPE. The next two paths listed in column 3 of row 1 may be three and four hop paths respectively between node BDGPE and network hub WAEPE. A review of available network paths shows that some nodes may have paths with fewer hops available to reach a network node. Some nodes, such as ATLPE depicted in row 3, may have multiple paths with the same number of hops. In this example ATLPE is listed with two paths containing four hops and one path containing five hops.

TABLE 1

| | NODE | PATH1, PATH2, PATH3 |
|---|---|---|
| 1 | BDGPE | BDGPEWAEP1WAEPE, BDGPEDNGP1WAEP1WAEPE, BDGPEDNGP1NYUP1WAEP1WAEPE |
| 2 | CHTPE | CHTPEWAEP1WAEPE, CHTPENYUP1WAEP1WAEPE, CHTPENYUP1DNGP1WAEP1WAEPE |
| 3 | ATLPE | ATLPEATLP1DNGP1WAEP1WAEPE, ATLPEATLP1RIJP1WAEP1WAEPE, ATLPEATLP1DNGP1NYUP1WAEP1WAEPE |

TABLE 1-continued

| NODE | PATH1, PATH2, PATH3 |
|---|---|
| 4 DMPPE | DMPPEDMPP1DNGP1WAEP1WAEPE, DMPPEDMPP1DNGP1NYUP1WAEP1WAEPE, DMPPEDMPP1DNJP1DNGP1WAEP1WAEPE |
| 5 DNGPE | DNGPEDNGP1WAEP1WAEPE, DNGPEDNGP1NYUP1WAEP1WAEPE, DNGPEDNGP1ATLP1RIJP1WAEP1WAEPE |
| 6 DNJPE | DNJPEDNJP1DNGP1WAEP1WAEPE, DNJPEDNJP1DNGP1NYUP1WAEP1WAEPE, DNJPEDNJP1DMPP1DNGP1WAEP1WAEPE |
| 7 ELPPE | ELPPEDMPP1DNGP1WAEP1WAEPE, ELPPEDNJP1DNGP1WAEP1WAEPE, ELPPEDMPP1DNGP1NYUP1WAEP1WAEPE |
| 8 HTNPE | HTNPEDMPP1DNGP1WAEP1WAEPE, HTNPEDMPP1DNGP1NYUP1WAEP1WAEPE, HTNPEDMPP1DNJP1DNGP1WAEP1WAEPE |
| 9 NEOPE | NEOPENEOP1ATLP1DNGP1WAEP1WAEPE, NEOPENEOP1ATLP1RIJP1WAEP1WAEPE, NEOPENEOP1DMPP1DNGP1WAEP1WAEPE |
| 10 LCAPE | LCAPELCAP1DMPP1DNGP1WAEP1WAEPE, LCAPELCAP1DMPP1DNGP1NYUP1WAEP1WAEPE, LCAPELCAP1SNFP1DNJP1DNGP1WAEP1WAEPE |
| 11 MIAPE | MIAPEATLP1DNGP1WAEP1WAEPE, MIAPEATLP1RIJP1WAEP1WAEPE, MIAPEATLP1DNGP1NYUP1WAEP1WAEPE |
| 12 NYUPE | NYUPENYUP1WAEP1WAEPE, NYUPENYUP1DNGP1WAEP1WAEPE, NYUPENYUP1DNGP1ATLP1RIJP1WAEP1WAEPE |
| 13 ORLPE | ORLPEATLP1DNGP1WAEP1WAEPE, ORLPEATLP1RIJP1WAEP1WAEPE, ORLPEATLP1DNGP1NYUP1WAEP1WAEPE |
| 14 PTNPE | PTNPEWAEP1WAEPE, PTNPERIJP1WAEP1WAEPE, PTNPERIJP1ATLP1DNGP1WAEP1WAEPE |
| 15 PYMPE | PYMPEWAEP1WAEPE, PYMPENYUP1WAEP1WAEPE, PYMPENYUP1DNGP1WAEP1WAEPE |
| 16 RIJPE | RIJPERIJP1WAEP1WAEPE, RIJPERIJP1ATLP1DNGP1WAEP1WAEPE, RIJPERIJP1ATLP1DNGP1NYUP1WAEP1WAEPE |
| 17 SCMPE | SCMPELCAP1DMPP1DNGP1WAEP1WAEPE, SCMPESNFP1DNJP1DNGP1WAEP1WAEPE, SCMPELCAP1SNFP1DNJP1DNGP1WAEP1WAEPE |
| 18 SDGPE | SDGPELCAP1DMPP1DNGP1WAEP1WAEPE, SDGPESNFP1DNJP1DNGP1WAEP1WAEPE, SDGPELCAP1DMPP1DNGP1NYUP1WAEP1WAEPE |
| 19 SEJPE | SEJPEDNJP1DNGP1WAEP1WAEPE, SEJPEDNJP1DNGP1NYUP1WAEP1WAEPE, SEJPEDNJP1DMPP1DNGP1WAEP1WAEPE |
| 20 SNFPE | SNFPESNFP1DNJP1DNGP1WAEP1WAEPE, SNFPESNFP1DNJP1DNGP1NYUP1WAEP1WAEPE, SNFPESNFP1DNJP1DMPP1DNGP1WAEP1WAEPE |

Table 2 may represent a listing of the same 22 network nodes and the hub with the paths ranked not only by a number of hops but also by the latency of the network path. Table 2 is exemplary and may contain a greater number or fewer number of network nodes and/or network paths. In some embodiments, ranking formulas may ensure that network paths with fewest hops are always listed first. Comparing row 3 of Table 1 with row 3 of Table 2 we find that the first two paths have switched order. This may be because ATLPEATLP1RIJP1WAEP1WAEPE and ATLPEATLP1DNGP1WAEP1WAEPE may have an identical number of hops (four hops apiece) but different latencies. Comparing the paths, the hops from node ATLPE to node ATLP1 are the same as are the hops from WAEP1 to WAEPE. Referring to Table 3, we can determine the latencies of network links.

TABLE 2

| NODE | PATH1, PATH2, PATH3 |
|---|---|
| 1 BDGPE | BDGPEWAEP1WAEPE, BDGPEDNGP1WAEP1WAEPE, BDGPEDNGP1NYUP1WAEP1WAEPE |
| 2 CHTPE | CHTPEWAEP1WAEPE, CHTPENYUP1WAEP1WAEPE, CHTPENYUP1DNGP1WAEP1WAEPE |
| 3 ATLPE | ATLPEATLP1RIJP1WAEP1WAEPE, ATLPEATLP1DNGP1WAEP1WAEPE, ATLPEATLP1DNGP1NYUP1WAEP1WAEPE |
| 4 DMPPE | DMPPEDMPP1DNGP1WAEP1WAEPE, DMPPEDMPP1DNGP1NYUP1WAEP1WAEPE, DMPPEDMPP1DNJP1DNGP1WAEP1WAEPE |
| 5 DNGPE | DNGPEDNGP1WAEP1WAEPE, DNGPEDNGP1NYUP1WAEP1WAEPE, DNGPEDNGP1ATLP1RIJP1WAEP1WAEPE |
| 6 DNJPE | DNJPEDNJP1DNGP1WAEP1WAEPE, DNJPEDNJP1DNGP1NYUP1WAEP1WAEPE, DNJPEDNJP1DMPP1DNGP1WAEP1WAEPE |
| 7 ELPPE | ELPPEDMPP1DNGP1WAEP1WAEPE, ELPPEDNJP1DNGP1WAEP1WAEPE, ELPPEDMPP1DNGP1NYUP1WAEP1WAEPE |
| 8 HTNPE | HTNPEDMPP1DNGP1WAEP1WAEPE, HTNPENEOP1ATLP1RIJP1WAEP1WAEPE, HTNPEDMPP1DNGP1NYUP1WAEP1WAEPE |
| 9 NEOPE | NEOPENEOP1ATLP1RIJP1WAEP1WAEPE, NEOPENEOP1ATLP1DNGP1WAEP1WAEPE, NEOPENEOP1DMPP1DNGP1WAEP1WAEPE |
| 10 LCAPE | LCAPELCAP1DMPP1DNGP1WAEP1WAEPE, LCAPELCAP1DMPP1NEOP1ATLP1RIJP1WAEP1WAEPE, LCAPELCAP1SNFP1DNJP1DNGP1WAEP1WAEPE |
| 11 MIAPE | MIAPEATLP1RIJP1WAEP1WAEPE, MIAPEATLP1DNGP1WAEP1WAEPE, MIAPENEOP1ATLP1RIJP1WAEP1WAEPE |
| 12 NYUPE | NYUPENYUP1WAEP1WAEPE, NYUPENYUP1DNGP1WAEP1WAEPE, NYUPENYUP1DNGP1ATLP1RIJP1WAEP1WAEPE |
| 13 ORLPE | ORLPEATLP1RIJP1WAEP1WAEPE, ORLPEATLP1DNGP1WAEP1WAEPE, ORLPENOP1ATLP1RIJP1WAEP1WAEPE |
| 14 PTNPE | PTNPEWAEP1WAEPE, PTNPERIJP1WAEP1WAEPE, PTNPERIJP1ATLP1DNGP1WAEP1WAEPE |
| 15 PYMPE | PYMPEWAEP1WAEPE, PYMPENYUP1WAEP1WAEPE, PYMPENYUP1DNGP1WAEP1WAEPE |
| 16 RIJPE | RIJPERIJP1WAEP1WAEPE, RIJPERIJP1ATLP1DNGP1WAEP1WAEPE, RIJPERIJP1ATLP1DNGP1NYUP1WAEP1WAEPE |
| 17 SCMPE | SCMPESNFP1DNJP1DNGP1WAEP1WAEPE, SCMPELCAP1DMPP1DNGP1WAEP1WAEPE, SCMPESNFP1DNJP1DNGP1NYUP1WAEP1WAEPE |
| 18 SDGPE | SDGPELCAP1DMPP1DNGP1WAEP1WAEPE, SDGPESNFP1DNJP1DNGP1WAEP1WAEPE, SDGPELCAP1DMPP1DNEOP1ATLP1RIJP1WAEP1WAEPE |
| 19 SEJPE | SEJPEDNJP1DNGP1WAEP1WAEPE, SEJPEDNJP1DNGP1NYUP1WAEP1WAEPE, SEJPEDNJP1DMPP1DNGP1WAEP1WAEPE |
| 20 SNFPE | SNFPESNFP1DNJP1DNGP1WAEP1WAEPE, SNFPESNFP1DNJP1DNGP1NYUP1WAEP1WAEPE, SNFPESNFP1LCAP1DMPP1DNGP1WAEP1WAEPE |

Table 3 may contain a first node of a link in column 2, a second node of a link in column 3, a class of a link in column 4, a length in V&H coordinate miles of a link in column 5, a length in actual network path miles in column 6 and a latency of the link in column 7. Table 3 is exemplary and may contain a greater number or fewer number of network links. When comparing the network paths discussed above, ATLPEATLP1RIJPLWAEP1WAEPE and ATLPEATLP1DNGP1WAEP1WAEPE, we can determine the latency of the corresponding hops of the paths. The difference between the two paths is the middle two hops. Thus, comparing the latency of the path from ATLP1RUP1WAEP1 with ATLP1DNGP1WAEP1 illustrates the difference. The latency of the link from network node ATLP1 to network node RUP1 (row 2, column 7) is listed as 7.01 milliseconds. The latency of the link from network node RIJP1 to network node WAEP1 (row 37, column 7) is 1.38 seconds. When adding the components of the second network path, the latency of the link from network node ATLP1 to network node DNGP1 (row 1, column 7) is 8.79 milliseconds. The latency of the link from network node DNGP1 to WAEP1 (row 11, column 7) is 9.17 milliseconds. Thus, the middle two hops of ATLPEATLP1RUP1WAEP1WAEPE have a latency of 8.39 milliseconds and the middle two hops of ATLPEATLP1DNGP1WAEP1WAEPE have a latency of 17.96 milliseconds. Since ATLPEATLP1RIJP1WAEP1WAEPE is 9.57 milliseconds faster than ATLPEATLP1DNGP1WAEP1WAEPE, ATLPEATLP1RUP1WAEP1WAEPE is listed first in Table 2 after the network paths in Table 1 are sorted for latency. As also illustrated in Table 3, the RTMILES (the miles traveled by the actual network link) may be calculated by multiplying the VHMILES, (the mileage between the V&H coordinates on a grid) by 1.5. In some embodiments, an actual measured value may be utilized for RTMILES. The latency may be calculated as one millisecond for every one hundred route miles. Thus, in row 1 the 878.8 route miles converts to a latency of 8.79 milliseconds. In some embodiments, latency may be calculated by other methods. In embodiments identifying network paths for an existing network (as opposed to a network which has only been modeled) latency may be measured by network diagnostic tools, the results of a ping test, or by other methods. In some embodiments, a minimum amount of latency may be utilized in the calculation process. For example, rows 45 and 46 may be links between nodes at a same location and may have zero route miles. A minimum latency value, such as 0.25 may ensure that a quarter of a millisecond is provided to account for processing time of one or more network nodes which may be required to transfer data between the two network nodes.

TABLE 3

| | LINK-END1 | LINK-END2 | CLASS | VHMILES | RTMILES | LATENCY |
|---|---|---|---|---|---|---|
| 1 | ATLP1 | DNGP1 | 2 | 585.8 | 878.7 | 8.79 |
| 2 | ATLP1 | RIJP1 | 2 | 467.2 | 700.8 | 7.01 |
| 3 | ATLPE | ATLP1 | 1 | 0.0 | 0.0 | 0.25 |
| 4 | BDGPE | DNGP1 | 1 | 204.7 | 307.1 | 3.07 |
| 5 | BDGPE | WAEP1 | 1 | 431.4 | 647.1 | 6.47 |
| 6 | CHTPE | NYUP1 | 1 | 142.3 | 213.5 | 2.14 |
| 7 | CHTPE | WAEP1 | 1 | 347.6 | 521.4 | 5.21 |
| 8 | DMPP1 | DNGP1 | 2 | 781.4 | 1172.2 | 11.72 |
| 9 | DMPP1 | NEOP1 | 2 | 442.0 | 663.0 | 6.63 |
| 10 | DMPPE | DMPP1 | 1 | 0.0 | 0.0 | 0.25 |
| 11 | DNGP1 | WAEP1 | 2 | 611.2 | 916.7 | 9.17 |
| 12 | DNGPE | DNGP1 | 1 | 0.0 | 0.0 | 0.25 |
| 13 | DNJP1 | DMPP1 | 2 | 659.7 | 989.6 | 9.90 |

TABLE 3-continued

| | LINK-END1 | LINK-END2 | CLASS | VHMILES | RTMILES | LATENCY |
|---|---|---|---|---|---|---|
| 14 | DNJP1 | DNGP1 | 2 | 897.3 | 1346.0 | 13.46 |
| 15 | DNJPE | DNJP1 | 1 | 0.0 | 0.0 | 0.25 |
| 16 | ELPPE | DMPP1 | 1 | 570.5 | 855.7 | 8.56 |
| 17 | ELPPE | DNJP1 | 1 | 552.8 | 829.2 | 8.29 |
| 18 | HTNPE | DMPP1 | 1 | 222.3 | 333.5 | 3.33 |
| 19 | HTNPE | NEOP1 | 1 | 323.4 | 485.1 | 4.85 |
| 20 | LCAP1 | DMPP1 | 2 | 1239.7 | 1859.6 | 18.60 |
| 21 | LCAP1 | SNFP1 | 2 | 349.6 | 524.4 | 5.24 |
| 22 | LCAPE | LCAP1 | 1 | 0.0 | 0.0 | 0.25 |
| 23 | MIAPE | ATLP1 | 1 | 597.5 | 896.2 | 8.96 |
| 24 | MIAPE | NEOP1 | 1 | 666.5 | 999.8 | 10.00 |
| 25 | NEOP1 | ATLP1 | 2 | 424.8 | 637.3 | 6.37 |
| 26 | NEOPE | NEOP1 | 1 | 0.0 | 0.0 | 0.25 |
| 27 | NYUP1 | DNGP1 | 2 | 730.0 | 1095.0 | 10.95 |
| 28 | NYUP1 | WAEP1 | 2 | 205.7 | 308.6 | 3.09 |
| 29 | NYUPE | NYUP1 | 1 | 0.0 | 0.0 | 0.25 |
| 30 | ORLPE | ATLP1 | 1 | 398.7 | 598.0 | 5.98 |
| 31 | ORLPE | NEOP1 | 1 | 534.7 | 802.0 | 8.02 |
| 32 | PTNPE | RIJP1 | 1 | 207.7 | 311.5 | 3.12 |
| 33 | PTNPE | WAEP1 | 1 | 118.7 | 178.1 | 1.78 |
| 34 | PYMPE | NYUP1 | 1 | 144.9 | 217.3 | 2.17 |
| 35 | PYMPE | WAEP1 | 1 | 61.8 | 92.7 | 0.93 |
| 36 | RIJPE | RIJP1 | 1 | 0.0 | 0.0 | 0.25 |
| 37 | RIJP1 | WAEP1 | 2 | 91.7 | 137.6 | 1.38 |
| 38 | SCMPE | LCAP1 | 1 | 363.6 | 545.4 | 5.45 |
| 39 | SCMPE | SNFP1 | 1 | 73.8 | 110.8 | 1.11 |
| 40 | SDGPE | LCAP1 | 1 | 110.6 | 166.0 | 1.66 |

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving network information associated with one or more network links, one or more network nodes, and a network hub;
identifying at least two network paths from at least one of the one or more network nodes to the network hub based on the network information;
determining a number of hops for each identified network path;
determining a latency of each link for each identified network path;
determining that at least one link is between nodes at a same location, and setting the latency value for the at least one link to a minimum latency value based on the determination;
summing the latencies of each link for each identified network path to calculate a total network path latency;
determining a ranking of the network paths based at least in part on the number of hops and the total network path latency;
calculating the distance of each network path utilizing a grid system of vertical and horizontal coordinates to identify locations of the one or more network nodes to determine a grid distance; and
multiplying the grid distance by a specified multiplier to determine a network path distance.

2. The method of claim 1, further comprising, for each network path:
comparing the number of hops with a specified number of hops; and removing the network path from a ranking determination in the event the number of hops exceeds the specified number of hops.

3. The method of claim 1, further comprising, for each network path:
comparing the latency with a specified latency; and
removing the network path from a ranking determination in the event the latency exceeds the specified latency.

4. The method of claim 1, wherein each network path comprises a private network backbone.

5. The method of claim 1, wherein the number of network paths identified is less than or equal to a specified maximum number of network paths.

6. The method of claim 1, wherein identifying a network path comprises identifying a first node and identifying a network link coupling the first node to the network hub to identify a single hop network path.

7. The method of claim 1, wherein identifying a network path further comprises analyzing one or more portions of the network information to determine a network path with a fewest number of hops between a first node and the network hub.

8. The method of claim 7, further comprising identifying one or more network paths with a second fewest number of hops between a first node the network hub.

9. The method of claim 1, wherein determining the latency of the one or more links of each network path further comprises multiplying a distance of each network path by a specified multiplier.

10. The method of claim 1, wherein determining a ranking comprising summing latencies of the one or more links and combining the summed latency with the product of the number of hops times a specified multiplier.

11. The method of claim 1, wherein determining a latency of a link ensures a specified minimum amount of latency.

12. The method of claim 1, further comprising generating a report listing the ranking of one or more network paths.

13. The method of claim 1, further comprising utilizing the ranking to generate a routing table for one or more nodes.

14. A computer readable media comprising code to perform the acts of the method of claim 1.

15. A system, comprising:
a database for storing network information; and
a processor configured to:
receive network information associated with one or more network links, one or more network nodes, and a network hub;
identify at least two network paths from at least one of the one or more network nodes to the network hub utilizing the network information;
determine a number of hops for each identified network path;
determine a latency of one or more links of each identified network path;
set the latency value for the at least one link to a minimum latency value if the at least one link is between nodes at a same location; and
determine a ranking of each identified network path based at least in part on the number of hops and the latency of each identified network path
calculate the distance of each network path utilizing a grid system of vertical and horizontal coordinates to identify locations of the one or more network nodes to determine a grid distance; and
multiply the grid distance by a specified multiplier to determine a network path distance.

16. The system of claim 15, wherein the processor is further configured to, for each network path:
compare the number of hops with a specified number of hops; and
remove the network path from the ranking in the event the number of hops exceeds the specified number of hops.

17. The system of claim 15, wherein the processor is further configured to, for each network path:
compare the latency with a specified latency; and
remove the network path from the ranking in the event the latency exceeds the specified latency.

18. The system of claim 15, wherein each network path comprises a private network backbone.

19. The system of claim 15, wherein the processor is further configured to, for each network path:
identify a network path by analyzing one or more portions of the network information to determine a network path with a fewest number of hops between a first node and the network hub.

20. The system of claim 15, wherein the processor is further configured to, for each network path:
determine the latency of the one or more links of the network path by multiplying a distance of the network path by a specified multiplier.

21. The system of claim 15, wherein the processor is further configured to generate a report listing the ranking of one or more network paths.

* * * * *